Dec. 31, 1968     R. J. LA MANNA     3,419,825

TORSIONAL DELAY LINE TRANSDUCER

Original Filed Jan. 20, 1966

INVENTOR
RICHARD J. LA MANNA
BY
ATTORNEY

United States Patent Office 3,419,825
Patented Dec. 31, 1968

3,419,825
TORSIONAL DELAY LINE TRANSDUCER
Richard J. La Manna, Whippany, N.J., assignor to Litton Business Systems, Inc., a corporation of New York
Continuation of application Ser. No. 521,937, Jan. 20, 1966. This application Dec. 12, 1967, Ser. No. 690,035
12 Claims. (Cl. 333—30)

ABSTRACT OF THE DISCLOSURE

An electromagnetic transducer for operating with a torsional stress-wave delay line comprises conductors affixed opposed ends of the delay line. Each conductor is placed within a magnetic field. Current passing through one of the conductors causes it, in accordance with the generator effect, to twist. The resulting twisting of the delay line causes a current to be generated in the second conductor.

---

This is a continuation of application Ser. No. 521,937, filed Jan. 20, 1966.

This invention pertains to an electromagnetic transducer and more particularly to an electromagnetic transducer for applying torsional stress to a torsional delay line.

Torsional delay lines as are widely used in the prior art and described in detail in United States Patent No. 3,011,136 for an Electro-Acoustic Delay Line by G. G. Scarrott, employ a delay element of nickel or similar material and a plurality of transducers which are composed of magnetostrictive elements for both the read-in and read-out of information from such torsional delay lines. As is shown in the cited Scarrott patent, the magnetostrictive elements of the transducers are coupled to the line in pairs at the read-in and read-out stations. Each transducer is composed of two separate elements, each of which must be connected precisely to the line in a plane and 180° from the other member of the transducer pair. It is necessary that the junctions between the magnetostrictive transducer elements and the delay line itself be such as to minimize reflections between the line and the transducer. Also, the inactive ends of the transducers must be terminated on their characteristics impedance to prevent spurious signals caused by reflections therefrom. Additionally, a coil is provided about each of the magnetostrictive elements to either impress a current thereon or to sense the current developed as a result of torsional stresses being impressed upon the line. The current supplied to the coils of the separate magnetostrictive elements of the transducer must be the same in their properties and amounts in order that proper functioning of the transducer takes place. Variations in the characteristics of the current applied or in the magnetomotive force developed by these coils is detrimental in the proper transducing of the input or output information to or from the line. The improper operation of the transducer may produce unwanted signals in the line in addition to those which are desired. Such unwanted signals may produce interference to prevent the proper propagation of the torsional stress-waves within the delay line itself.

Additionally, the magnetostrictive elements show a property of saturation wherein for given amounts of current the magnetostrictive element will constrict in a linear fashion but after the saturation level has been reached the amount of distortion of the magnetostrictive elements will no longer follow a linear relationship with respect to the impressed current. Thus a limit is placed upon the maximum amount of current and therefore the displacement which is achievable by the line. Further, the coils employed for applying current to stress the magnetostrictive elements present additional limitations. The frequency of operation of the magnetostrictive elements is inversely proportional to the length of the coil. The coil must be long enough to develop the necessary driving forces but not so short as to permit fringing or dissipation of the applied current. Thus the coil must be chosen as a compromise between these factors resulting in a definite frequency limit for the line.

The disadvantages noted above with respect to prior art lines is overcome in the present invention which employs the well-known motor technique for impressing a torsional stress-wave upon torsional stress-wave delay lines and which employs the generator principle for the production of read-out currents from a stressed line. A copper conductor is attached directly to the ends of a delay line, whether the delay line be either in a straight or curved configuration. These conductors are in the shape of a U with extended arms such that the ends of the line will fit within the curved base region of the conductor. The conductor is then placed with respect to a permanent magnet. A current may then be passed through the conductor and due to the repulsive forces created between the induced flux of the current passing through the conductor and a flux of the permanent magnet, a couple will be produced which will tend to rotate the conductor and the line thus placing a stress upon it. For a receiving transducer the same arrangement is used, however, current is not supplied to the conductor, instead, the rotation of the conductor with respect to the magnetic field created by the permanent magnet will induce a current within the conductor, which current can be detected and employed to indicate the amount of stress placed upon the line and thus the signal stored therein.

The device of the invention is not susceptible to the same restraints as is found in the prior art devices. If the transducer is formed of a single conductor the problem of aligning two separate magnetostrictive transducer elements as in Scarrot is completely avoided. In addition, there is no requirement for an individual coil for each of the transducer elements since current is passed through the entire length of the conductor. Any amount of current, short of that which might cause the melting of the conductor, can be passed through the conductor thus retaining the linearity between input current and stress supplied to the line over its useful range. Further, since a great area of the conductors is provided for attachment to the line itself, the attachment of the conductor to the line is not critical as it is with the magnetostrictive elements shown in the prior art devices. It is therefore an object of this invention to provide a new and improved form of electromagnetic transducer for operating a torsional delay line.

It is yet another object of this invention to provide a simple form of electromagnetic transducer for operating a torsional delay line which transducer operates on motor-generator principles.

It is yet another object of this invention to provide an improved form of torsional delay line transducer which is capable of linear operation over a broad range of signal input.

It is yet another object of this invention to provide an electromagnetic transducer for operating a torsional delay line for the wide range of frequencies.

Other objects and features of the invention will be pointed out in the following description and claims and illustrated in the accompanying drawings, which disclose, by way of example, the principle of the invention, and the best mode which has been contemplated for carrying it out.

In the drawings:
FIG. 1 is a plan view of a torsional delay line with transducers constructed in accordance with the invention installed at the two ends of the delay line.

Similar elements will be given similar reference characters in each of the respective drawings.

Figure 1:
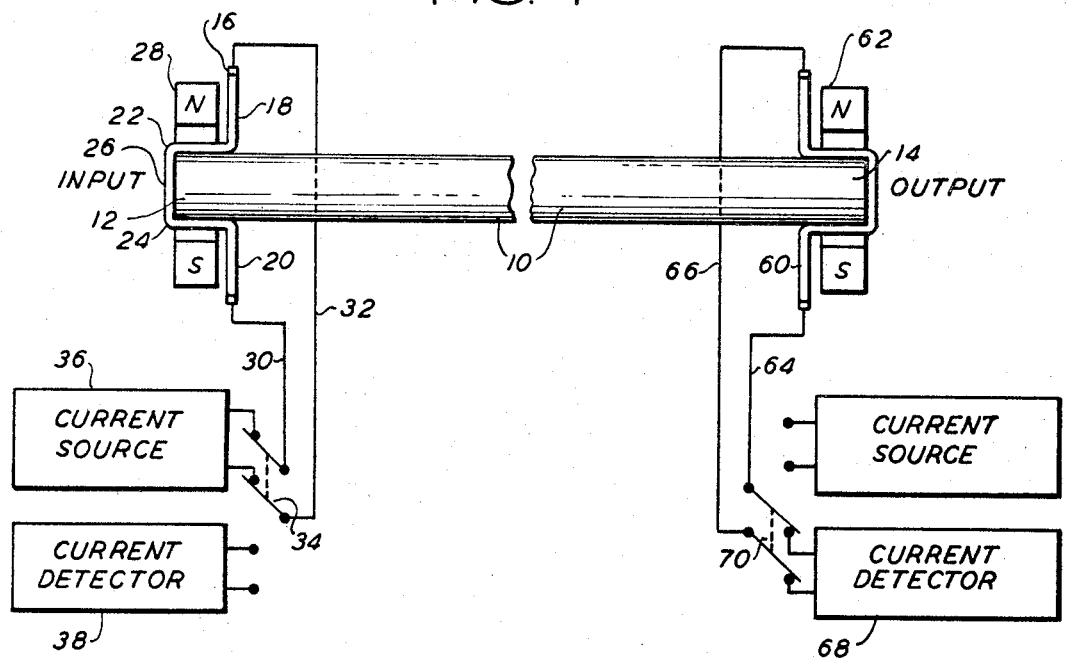

Turning now to FIG. 1 there is shown a torsional delay line 10 together with an input and output transducer arrangement. The torsional delay line 10 may be constructed of any material having the constant propagation speed over a wide temperature range and one which shows poor conductivity to electrical currents. Such a delay line may be constructed from materials such as NiSpan C or other nickel-iron alloys. At a first end 12, of the delay line 10 there is coupled a conductor 16 which is in a generally U-shape having two extending arms, 18 and 20, extending from the main arms 22 and 24, of the conductor 16. The base portion 26 of the conductor 16 is in a plane parallel with the end 12 of the line 10. The extending arms 18 and 20 will be in the same plane and will be in a plane parallel to the end 12 of the line 10. The conductor 16 may be coupled to the torsional line 10 by means of spot-welding either conventional or sonic or coupled by means of epoxy resin. Positioned adjacent the extended arms 18 and 20 of the conductor 16 is a permanent magnet 28 having a north pole in juxtaposition with the arm 18 of the conductor 16 and having a south pole in juxtaposition with the arm 20 of the conductor 16. Current conductors 30 and 32 are coupled respectively to the extended arms 20 and 18 of the conductor 16. The current conductors 30 and 32 are connected by means of a switch 34 to either a current source 36 or a current detector 38. When the switch 34 is in a position to contact the output terminals of the current source 36 (as shown in the figure) the transducer will be one to impress torsional stress-waves upon the torsional stress-wave delay line 10 and when in contact with the terminals of the current detector 38 then the transducer will be employed to detect the torsional stress-waves then being propagated down the delay line 10.

Figure 2:
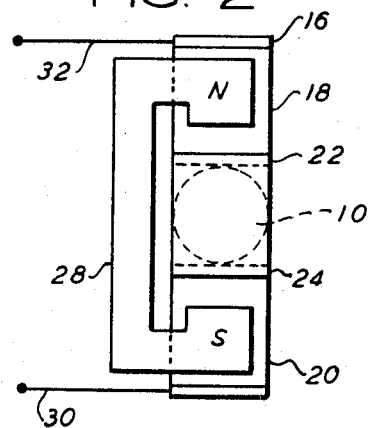
FIG. 2 is a front view of a transducer constructed in accordance with the invention and as shown in FIG. 1.

FIG. 2 shows a front view of the arrangement of FIG. 1 and permits a better understanding of the relative positioning and size of the permanent magnet 28 with respect to the conductor 16 of FIG. 1. The conductor 16 is made approximately as wide as the diameter of the delay line 10, while the pole pieces of the permanent magnet 28 are made approximately two-thirds as wide as the conductor 16. Further the pole ends of the permanent magnet are bent inwardly toward the conductor. The combination of the shape and size of the pole pieces of the permanent magnet 28 serve to concentrate its effects near the center of the conductor and prevent unwanted dispersement of the resulting field. The current conductors 30 and 32 are coupled to the ends of the conductor 16 so as to move with the rotation of the conductor 16.

Figure 3:
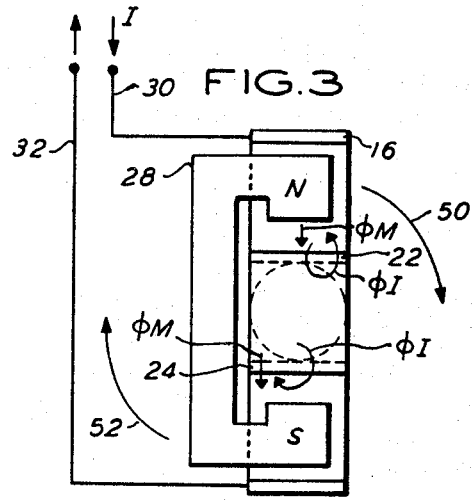
FIG. 3 is a representation of the various magnetic forces operating upon the transducer of FIG. 1.

Turning now to FIG. 3 the manner of operation of the transducer of this invention, when employed to stress the delay line 10, will be set forth. Switch 34 would be closed to contact the terminals of the current source 36 as shown in FIG. 1. This would produce a current in current conductor 30 in the direction shown by the arrow and identified by reference character I. This current would cause to exist through the conductor 16 which as shown in FIG. 3 would indicate the current coming out within the arm 22 of the conductor 16 and going in the arm 24 of the conductor 16. As a result of the current coming out, as shown by the conventional notation of a dot in the arm 22, a field will be created about arm 22 in a counterclockwise direction, which field will oppose the field of the permanent magnet extending from the north pole to the south pole of the permanent magnet 28. The end result of the interaction of the field created by the current direction in the arm 22 and the north pole of the permanent magnet 28 will be a torque in the direction of the arrow 50. The current passing into the plane of the paper as shown by the tail of the arrow in the arm 24 will produce a clockwise field which will oppose the direction of the magnetic field of the permanent magnet 28 at the south pole of the permanent magnet 28 and will again produce a component torque which is downward in the direction of the arrow 52. The combined effects of the torques 50 and 52 is to tend to rotate the conductor 16 in a clockwise direction. This motion and torque upon the conductor 16 is transmitted or propagated as a torsional stress-wave down the length of the delay line 10. Upon receipt of the stress-wave at the end 14 (note FIG. 1), current is produced in the conductor 60 by generator action due to the movement of the conductor 16 with respect to the field of permanent magnet 62 arranged adjacent the conductor 60 at the end 14 of the delay line 10. The current induced in this conductor will be fed over the output lines 64 and 66 to a current detector 68 through the switch 70. This current will be detected and its value will be proportional to the stress in the line. It should be noted that the same transducers may be used for either the propagation of a signal in the delay line or the receipt of a signal from the delay line depending upon the positions of the switches 34 and 70.

Figure 4:
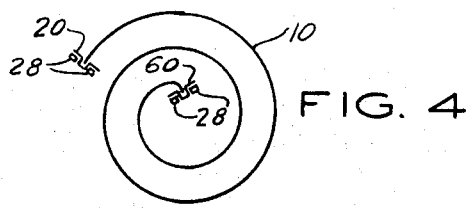
FIG. 4 shows the transducers employed at the terminal ends of a torsional delay line arranged in a curved configuration.

Although the line 10 of FIG. 1 is shown as a straight line, the transducers of FIGS. 1, 2 and 3 may equally be employed with a curved line such as illustrated in FIG. 4. The operation of the transducer will be the same in this case as it was with respect to FIG. 1.

Although there have been shown and described and pointed out the fundamental novel features of the invention as applied to the preferred embodiments it will be understood that various omissions, substitutions and changes of the form and details of the device as illustrated and in its operation may be made by those skilled in the art, without departing from the spirit of the invention.

The embodiments of the invention in which an exclusive property or privilege is claimed, I define as follows:

1. An electromagnetic transducer for operating with a torsional stress-wave delay line comprising:
  (a) an electrical conductor coupled to and having at least one element axially disposed along the delay line; and
  (b) magnetic field producing means for passing a magnetic field at least in a direction transversely through the element and radially with respect to the delay line.

2. An electromagnetic transducer as described in claim 1, wherein the electrical conductor has at least two elements, each axially disposed along the delay line.

3. An electromagnetic transducer as described in claim 2, wherein the flux producing means is a magnet.

4. An electromagnetic transducer as defined in claim 3, wherein the magnet is a permanent magnet.

5. An electromagnetic transducer as recited in claim 3, wherein the magnet is an electromagnet.

6. An electromagnetic transducer as recited in claim 3, wherein the magnet has a north magnetic pole adjacent to the first of the two elements and the south magnetic pole adjacent to the second of the two elements.

7. An electromagnetic transducer as defined in claim 6, wherein the conductor is U-shaped being mounted to the end of the delay line at its base and the two arms thereof forming the elements whereby current flowing through the element will cause the conductor to impart torsional stress to the delay line or torsional stress upon the delay line will cause a current to be induced in the elements.

8. An electromagnetic transducer as defined in claim 7, wherein the conductor is welded to the delay line.

9. An electromagnetic transducer as defined in claim 1, wherein the delay line is a straight line.

10. An electromagnetic transducer as recited in claim 1, wherein the delay line is disposed of in a curved configuration.

11. An electromagnetic transducer as recited in claim 3, includes connecting means adapted to connect the conductor to a current source means or a current detector means.

12. An electromagnetic transducer as recited in claim 11, wherein the connecting means includes switching means for selectively connecting the conductor to the current source or the current detector means.

References Cited

UNITED STATES PATENTS

| 2,667,621 | 1/1954 | Burns et al. | 333—71 |
| 3,051,916 | 8/1962 | Rothbart | 333—30 |
| 3,127,578 | 3/1964 | Long | 333—30 |
| 3,177,450 | 4/1965 | Tzannes et al. | 333—30 |

ROY LAKE, *Primary Examiner.*

DARWIN R. HOSTETTER, *Assistant Examiner.*

U.S. Cl. X.R.

310—26

UNITED STATES PATENT OFFICE
CERTIFICATE OF CORRECTION

Patent No. 3,419,825                                December 31, 1968

Richard J. La Manna

It is certified that error appears in the above identified patent and that said Letters Patent are hereby corrected as shown below:

In FIG. 3 of the drawings, in the counterclockwise curved arrow insert -- . --; in the clockwise arrow insert -- + --. Column 3, lines 61 and 69, after "FIG. 3", each occurrence, inse a comma; line 68, "exist" should read -- pass --; line 69, after "which" insert a comma. Column 4, line 6, after "paper" insert a comma; line 7, after "24" insert a comma; lines 9 and 10, "of the permanent magnet 28" should read -- thereof --; line 11, "downward" should read -- upward --; line 17, after "the" insert -- other --.

Signed and sealed this 20th day of October 1970.

(SEAL)

Attest:

Edward M. Fletcher, Jr.

Attesting Officer

WILLIAM E. SCHUYLER, JR
Commissioner of Patents